(12) United States Patent
Augesky

(10) Patent No.: US 7,336,018 B2
(45) Date of Patent: Feb. 26, 2008

(54) CIRCUIT CONFIGURATION FOR CHARGING AND DISCHARGING A PLURALITY OF CAPACITIVE ACTUATORS

(75) Inventor: Christian Georg Augesky, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 546 days.

(21) Appl. No.: 11/043,321

(22) Filed: Jan. 26, 2005

(65) Prior Publication Data

US 2005/0231170 A1   Oct. 20, 2005

(30) Foreign Application Priority Data

Jan. 26, 2004   (DE)   ............. 10 2004 003 838

(51) Int. Cl.
 *H01L 41/09* (2006.01)
(52) U.S. Cl. .................. 310/316.03; 310/317
(58) Field of Classification Search ........... 310/316.03, 310/317
See application file for complete search history.

(56) References Cited

U.S. PATENT DOCUMENTS 6,441,535 B2 *  8/2002  Freudenberg et al. .. 310/316.03
6,563,252 B2     5/2003  Schrod
6,619,268 B2 *  9/2003  Rueger et al. ............ 123/490
7,019,436 B2 *  3/2006  Rueger et al. ......... 310/316.03
2002/0121958 A1  9/2002  Schrod

FOREIGN PATENT DOCUMENTS

DE   198 14 594 A1   10/1999
DE   199 44 733 A1    3/2001

\* cited by examiner

*Primary Examiner*—Thomas M. Dougherty
(74) *Attorney, Agent, or Firm*—Laurence A. Greenberg; Werner H. Stemer; Ralph E. Locher

(57) ABSTRACT

A circuit is provided for charging and discharging a plurality of capacitive actuators, which can be produced with little component outlay and minimizes power loss. The circuit has a charge capacitor, which is charged to a charge voltage predefined in relation to a reference potential, and charge circuits for charging one of the capacitive actuators in each instance which are connected parallel to the charge capacitor and in each of which one of the capacitive actuators is disposed in a series circuit with a choke and a selector/charge switch. The charge circuits have a common charge circuit section containing the choke. Discharge circuits are provided for discharging one of the capacitive actuators in each instance, which are connected parallel to the series circuits formed by the choke and the capacitive actuators and a discharge switch. The discharge circuits having a common discharge circuit section containing the discharge switch.

2 Claims, 1 Drawing Sheet

*alternative

CIRCUIT CONFIGURATION FOR CHARGING AND DISCHARGING A PLURALITY OF CAPACITIVE ACTUATORS

BACKGROUND OF THE INVENTION

Field of the Invention

The present invention relates to a circuit configuration for charging and discharging a plurality of capacitive actuators, in particular piezo-elements in a fuel injection configuration in an internal combustion engine.

The fact that exhaust gas standards for engines have become increasingly strict recently has resulted in particular in the development of fuel injectors with a rapid and delay-free response in the automotive industry. Piezo-electric elements in particular have proven to be advantageous for the practical implementation of such actuators. Such piezo-elements generally contain a stack of piezo-ceramic disks, operated via a parallel electric circuit, in order to be able to achieve the required electric field strengths for an adequate elongation.

The use of piezo-electric ceramic systems to activate fuel injection valves in an internal combustion engine imposes very stringent requirements on the electronics system for charging and discharging the piezo-ceramic system. Comparatively high voltages (typically 100 V or more) have to be supplied and in the short term comparatively large currents are required for charging and discharging (typically greater than 10 A). To optimize the engine characteristics (e.g. exhaust gas values, power, consumption, etc.) the charging and discharging processes should take place in fractions of milliseconds but at the same time with comprehensive control of current and voltage. The particular nature of the piezo-ceramic system as an almost purely capacitive load with only comparatively little conversion of active power but with a high level of reactive power requires more or less complex circuit concepts for the electronic system to control the piezo-elements.

A circuit configuration for controlling at least one capacitive actuator is known from published, non-prosecuted German patent application DE 199 44 733 A1 (corresponding to U.S. Pat. No. 6,563,252 and U.S. patent disclosure No. 2002/0121958). This known configuration is based on an isolating transformer operating in a bi-directional manner and allows precise measurement of energy portions when charging and discharging the actuator, so that almost any mean current characteristics can be achieved during charging and discharging. The isolating transformer principle results in however that not insignificant loads can be generated at the switching transistors, which tend to have a negative impact on the electrical efficiency and associated with this on the thermal load on the circuit configuration. This should be taken into account when selecting the electrical components used for the circuit configuration. Even though this known solution is functionally completely satisfactory, it still has a certain improvement potential in respect of cost, loss of electric power and electromagnetic compatibility, which might be of interest for future applications.

Published, non-prosecuted German patent application DE 198 14 594 A1 discloses a circuit configuration for charging and discharging a piezo-electric element. This known control circuit is based on a half-bridge output stage, which controls the piezo-element via an inductivity (choke), the choke serving in the first instance to limit the charge current occurring during charging and the discharge current occurring during discharging. Although during the control operation charging can be effected with an interruption-free current flow and therefore a very high level of efficiency and the load on the components used is less than with the isolating transformer configuration mentioned above, the circuit configuration as such is still not suitable for controlling a plurality of capacitive actuators.

Known circuit configurations for charging and discharging a plurality of capacitive actuators (see for example published, non-prosecuted German patent application DE 199 44 733 A1) have—in addition to at least one charge switch and one discharge switch—a so-called selector switch for each actuator, by which the actuator to be charged or discharged is initially selected.

SUMMARY OF THE INVENTION

It is accordingly an object of the invention to provide a circuit configuration for charging and discharging a plurality of capacitive actuators which overcomes the above-mentioned disadvantages of the prior art devices of this general type, which can be achieved with little component outlay while still minimizing power loss.

The circuit configuration according to the invention for charging and discharging a plurality of capacitive actuators, in particular piezo-elements in a fuel injector configuration in an internal combustion engine, contains a charge capacitor, which is charged by an energy source to a charge voltage predefined in relation to a reference potential. Charge circuits are provided for charging one of the capacitive actuators in each instance, which are connected parallel to the charge capacitor and in which one of the capacitive actuators in each instance is disposed in a series circuit with a choke and a selector/charge switch. The charge circuits have a common charge circuit section containing the choke and a plurality of charge circuit sections configured parallel to each other corresponding to the number of capacitive actuators. Each of the charge circuit sections contains one of the selector/charge switches connected in series to the capacitive actuators. Discharge circuits are provided for discharging in each instance one of the capacitive actuators, which are connected parallel to the series circuits formed by the choke and the capacitive actuators and contain a discharge switch. The discharge circuits have a common discharge circuit section containing the discharge switch and a plurality of discharge circuit sections configured parallel to each other corresponding to the number of capacitive actuators. Each of the discharge sections contains a decoupling diode.

With respect to the envisaged low component outlay, according to the invention the charge circuits and the discharge circuits both advantageously have a common charge circuit section or discharge circuit section. Part of both the common charge circuit section and the common discharge circuit section is hereby formed by the choke used, which is therefore advantageously used both during charging and during discharging. In respect of the low component outlay it is also advantageous that the selector/charge switches contained in the plurality of charge circuits configured parallel to each other can carry out the functions of selecting an actuator to be charged and also initiating a corresponding charge current. It is therefore not necessary to provide separate selector switches to select the actuator to be charged. Finally the configuration of decoupling diodes in a plurality of discharge circuit sections configured parallel to each other also makes it is possible to initiate discharge via a single discharge switch, disposed for this purpose in the common discharge circuit section. Overall therefore there is a minimum number of power components, both active and passive.

A freewheeling charge path containing a freewheeling diode is preferably formed in each instance between the choke and each of the capacitive actuators, to form a freewheeling current circuit, via which the charge current can once again flow after the relevant selector/charge switch has been turned off.

To achieve regulated charging and discharging of the actuators, as is particularly of major advantage when using the actuators in a fuel injector configuration in an internal combustion engine, a physical variable characterizing the charge status of the capacitive actuators must be detected. In a preferred embodiment there is therefore provision for a sensing resistor to be assigned to the actuators or each of the actuators in series and the charge current and/or discharge current flows via the sensing resistor, at which the voltage drop representing the current can be measured. It is also preferable for a sensing resistor to be provided, which forms part of the common charge circuit section and/or the common discharge circuit section.

Other features which are considered as characteristic for the invention are set forth in the appended claims.

Although the invention is illustrated and described herein as embodied in a circuit configuration for charging and discharging a plurality of capacitive actuators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
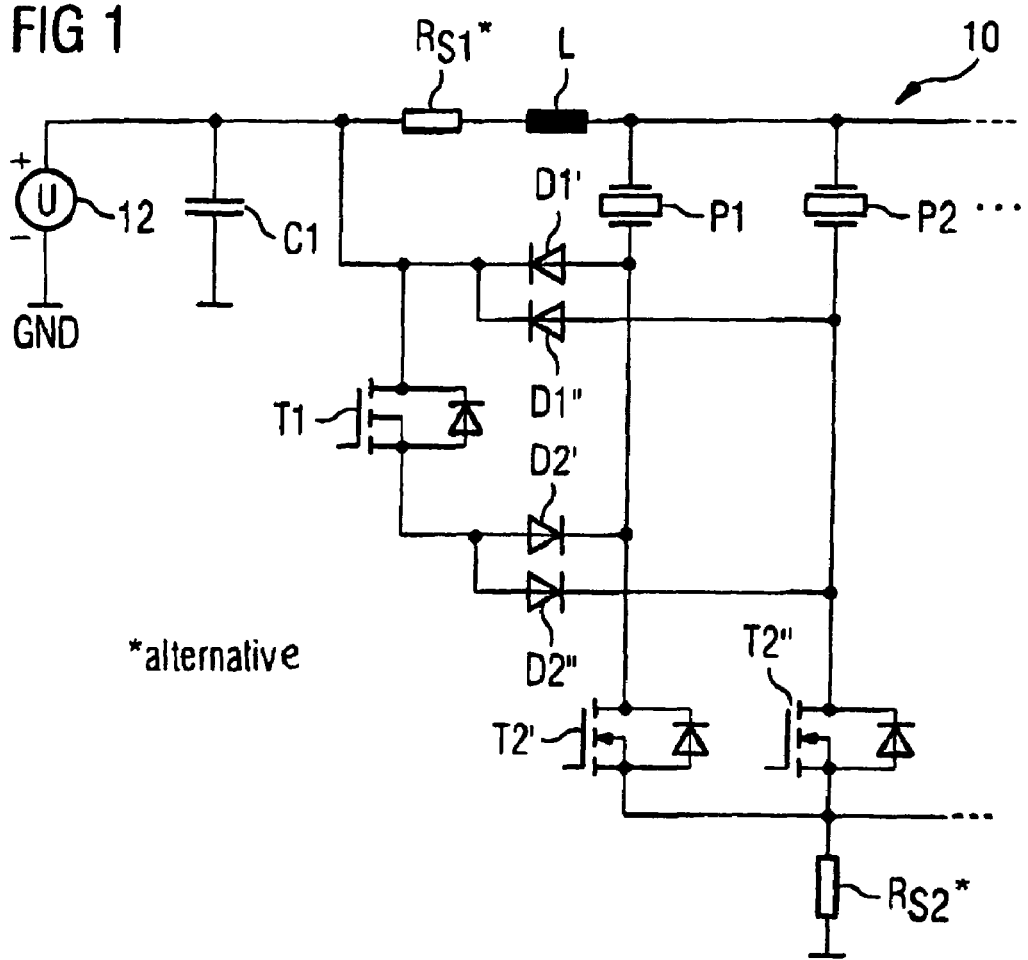
FIG. 1 is a circuit diagram of a configuration for controlling a plurality of piezo-elements according to a first embodiment of the invention.

Referring now to the figures of the drawing in detail and first, particularly, to FIG. 1 thereof, there is shown a circuit diagram of a configuration marked as a whole as 10 for charging and discharging a plurality of capacitive actuators in the form of piezo-elements in a fuel injection unit of a motor vehicle. For the sake of clarity only two of the plurality of piezo-elements are shown in the FIG. 1 (and marked P1 and P2) and described below. In fact the fuel injection unit has for example four injectors and correspondingly four piezo-elements. The piezo-element configuration P1, P2 . . . is located directly on the relevant internal combustion engine, while the remainder of the circuit configuration 10 shown is housed in a so-called engine control device of the motor vehicle and connected to the injectors via a cable harness.

The circuit configuration 10 contains a charge capacitor C1, which is charged during the operation of the circuit configuration by a DC/DC converter 12 to a charge voltage of U=200 V predefined in relation to a reference potential GND (electrical vehicle earth). The DC/DC converter 12 is hereby supplied by a non-illustrated motor vehicle battery with a vehicle electrical system voltage of for example 12V.

The circuit configuration 10 also contains a charge circuit configuration and a discharge circuit configuration for charging the piezo-elements P1, P2 . . . in relation to the reference potential GND starting from the charge voltage U or to discharge the piezo-elements P1, P2 . . . . The piezo-elements are each used in the known manner as actuators in a servo-injection valve, which starts a fuel injection process when the piezo-element is charged, the process being terminated again when the piezo-element is discharged.

The charge circuit configuration contains a charge circuit connected parallel to the charge capacitor C1, in which the capacitive actuator P1 is disposed in a series circuit with an inductive element or choke L and a charge switch in the form of a FET T2'. In the example shown the charge circuit runs from the charged terminal of the charge capacitor C1 via a sensing resistor Rs1, the choke L, the piezo-element P1 and the charge switch T2' to the vehicle earth GND. The resistor Rs2 shown in FIG. 1 represents an alternative to the sensing resistor configuration. Only one of the two sensing resistors Rs1, Rs2 marked is preferably actually present.

A freewheeling diode D1' is also disposed as shown between a circuit node connecting the piezo-element P1 and the charge switch T2' and a circuit node connecting the charge capacitor C1 and the sensing resistor Rs1, so that during switched-mode operation of the switch T2' at a charge switching frequency typically in a range from 1 kHz to 100 kHz, with T2' turned on, a charge current flows from the capacitor C1 via the sensing resistor Rs1, the choke L, the piezo-element P1 and the switch T2' to the vehicle earth GND, while with T2' turned off, a charge current flows in a freewheeling charge path formed by the choke L, the piezo-element P1, the freewheeling diode D1' and the sensing resistor Rs1.

As shown, a similar charge circuit with freewheeling current circuit is formed for each further piezo-element, for the piezo-element P2 for example by the sensing resistor Rs1, the choke L, the piezo-element P2 itself and a selector/charge switch T2" or a freewheeling diode D1". The charge circuits therefore have a common charge circuit section containing the choke L and the sensing resistor Rs1 and a plurality of charge circuit sections configured parallel to each other corresponding to the number of piezo-elements P1, P2 . . . , each of which sections contains the relevant piezo-element P1, P2 . . . and, connected in series to this, the selector/charge switch T2', T2" . . . and is connected via respective freewheeling diodes D1', D1" . . . to the terminal of the sensing resistor Rs1 on the left in FIG. 1.

The selector/charge switches T2', T2" are therefore hereby used both to turn on the required charge current and to select the piezo-element from the plurality of piezo-elements used. Therefore a plurality of piezo-elements can advantageously be charged at the voltage supply formed by the charge capacitor C1 in a very simple manner as far as circuits are concerned. This also applies to the discharging of the piezo-elements, as described below.

The discharge circuit configuration has a discharge circuit connected parallel to the series circuit formed by the choke L and the capacitive actuator for discharging the piezo-element P1. The discharge circuit for the piezo-element P1 is formed by a series circuit containing the sensing resistor Rs1, a discharge switch in the form of an FET T1 and a decoupling diode D2'. Similar discharge circuits are thereby formed for all further piezo-elements, for the piezo-element P2 for example by the sensing resistor Rs1, the discharge switch T1 and a decoupling diode D2". The discharge circuits therefore have a common discharge circuit section containing the sensing resistor Rs1 and the discharge switch T1 and a plurality of discharge circuit sections configured parallel to each other corresponding to the number of piezo-elements P1, P2 . . . , each of which sections is formed by one of the decoupling diodes D2', D2" . . . .

To discharge all the piezo-elements P1, P2 . . . , the discharge switch T1 is operated in switched mode (like the selector/charge switches T2', T2" . . . during charging), as a result of which the last charged piezo-element is discharged in a controlled manner via the corresponding discharge circuit.

Switched mode operation of the discharge switch T1 results advantageously in the feeding back of electrical energy from the relevant piezo-element to the charge capacitor C1. This fed back energy is therefore available for the next charge process.

With the circuit configuration 10 it is therefore possible to charge and discharge a plurality of capacitive actuators in a manner that is simple as far as circuits are concerned, with minimal component outlay and a high level of efficiency and therefore little loss of power. Only one switch element is present in each instance, connected in series to the piezo-element when the latter is being charged and discharged. The combination shown of a "selector switch" and a "charge switch" dispenses with the need for a (relatively expensive) additional switch as provided for in the prior art. The decoupling of the charge and discharge branches as shown via a diode configuration is also favorable in respect of the cost of the circuit configuration. Finally, with the circuit shown, a single sensing resistor (Rs1) is sufficient to measure both the charge current and the discharge current.

The number of power components, both passive components such as the choke and diodes and active components such as the switching transistors, is minimal.

When the sensing resistor Rs2 is used with the circuit configuration according to FIG. 1, the voltage drop representing the current flow can advantageously be measured at this resistor in relation to the fixed potential of the vehicle earth GND. Unlike the sensing resistor Rs1, the voltage drop to be measured is therefore not "floating". This simplifies the circuit outlay for the part of the non-illustrated electronic engine control system, which detects the voltage drop.

Figure 2:
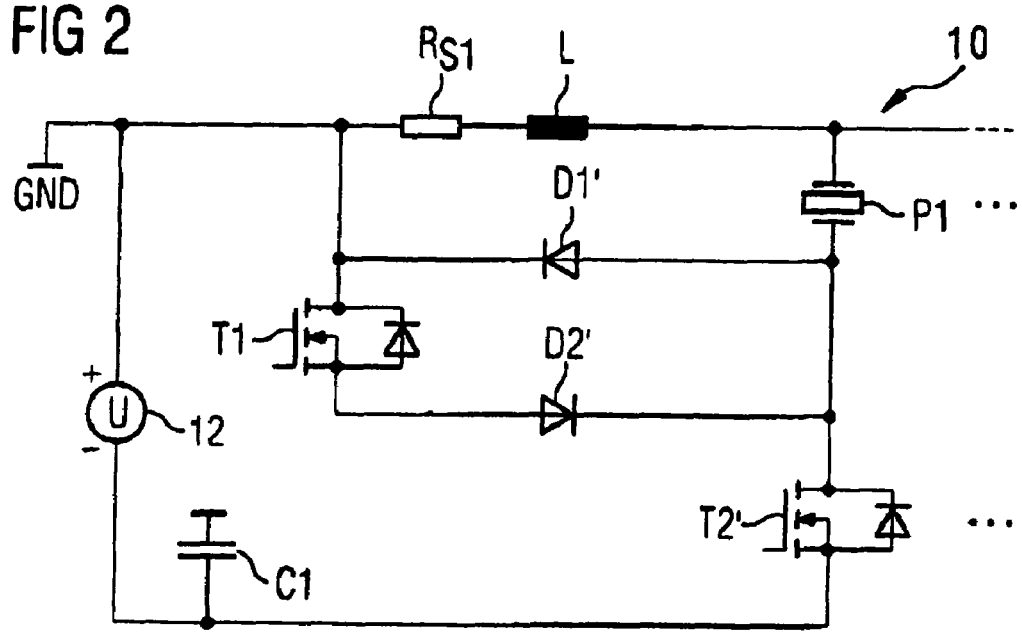
FIG. 2 is a circuit diagram of a configuration for controlling the plurality of piezo-elements according to a second embodiment of the invention.

In the description which follows of a further exemplary embodiment with reference to FIG. 2 the same reference characters are used for similar electronic components. Essentially only the differences compared with the exemplary embodiment already described with reference to FIG. 1 are examined and reference is therefore specifically made to the relevant description.

FIG. 2 shows the circuit configuration 10 that is modified compared with the circuit configuration in FIG. 1 and is again suitable for controlling any number of capacitive actuators, of which for the sake of clarity in the FIG. 2 only one of the actuators is shown in the form of the piezo-element P1.

With the circuit configuration according to FIG. 2 the charge capacitor C1 is charged by the DC/DC converter 12 to a negative charge voltage U in relation to the reference potential GND. In practice this results in no additional outlay, as the charge voltage has to be derived by the converter 12 from the voltage of the vehicle electrical system and the conversion methods commonly used for this purpose do not restrict the polarity of the converter output voltage generated.

This has two advantages compared with the circuit according to FIG. 1. First, the operating potential relating to the vehicle earth GND is not permanently present at the actuators but only in the activated state (when the actuator is being charged). This alleviates the problem of any short-circuits occurring in practice on the lines between the electronic engine control system and the fuel injector configuration.

Second, the sensing resistor Rs1 is located in the earth line so that detection of the dropping voltage there is simplified due to the fixed reference potential (no so-called "level shift" required).

The electronic control system for controlling the transistors T1, T2', . . . can advantageously be structured on the basis of the vehicle earth GND, although then the selector/charge switches T2', T2", . . . must be controlled in a floating manner.

Finally a further modification of the circuit shown in FIG. 2 is possible, in which only the polarity of the charge voltage U is reversed compared with the circuit shown in FIG. 2. In this case the entire electronic control system should be structured in a floating manner on the basis of the negative reference GND.

This application claims the priority, under 35 U.S.C. § 119, of German patent application No. 10 2004 003 838.4, filed Jan. 26, 2004; the entire disclosure of the prior application is herewith incorporated by reference.

I claim:

1. A circuit configuration for charging and discharging a plurality of capacitive actuators in a fuel injector configuration in an internal combustion engine of a vehicle, the circuit configuration comprising:

an energy source;

a charge capacitor connected to and charged by said energy source to a charge voltage predefined in relation to a vehicle ground, the charge voltage being selected as negative in relation to the vehicle ground;

charge circuits each for charging one of the capacitive actuators, said charge circuits each connected parallel to said charge capacitor, said charge circuits having a common charge circuit section containing a choke and a plurality of charge circuit sections configured parallel to each other and corresponding to a number of the capacitive actuators, said charge circuit sections each having a selector/charge switch, in each of said charge circuits one of the capacitive actuators is disposed in a series circuit with said choke and said selector/charge switch, each of said charge circuit sections having said selector/charge switch connected in series to one of the capacitive actuators;

discharge circuits each for discharging one of the capacitive actuators, said discharge circuits having a common discharge circuit section containing a discharge switch and a plurality of discharge circuit sections configured parallel to each other and corresponding to the number of the capacitive actuators, said discharge circuits each connected parallel to a series circuit formed by said choke and one of the capacitive actuators, each of said discharge circuit sections having a decoupling diode; and a sensing resistor for measuring current flowing via the capacitive actuators during charging and discharging, said sensing resistor disposed in a series circuit with said choke such that said choke forms part of said common charge circuit section and said common discharge circuit section, said sensing resistor having a terminal connected to the vehicle ground.

2. The circuit configuration according to claim 1, wherein each of said charge circuit sections having a freewheeling charge path containing a freewheeling diode being formed in each instance between said choke and each of the capacitive actuators.

* * * * *